Patented Aug. 26, 1952

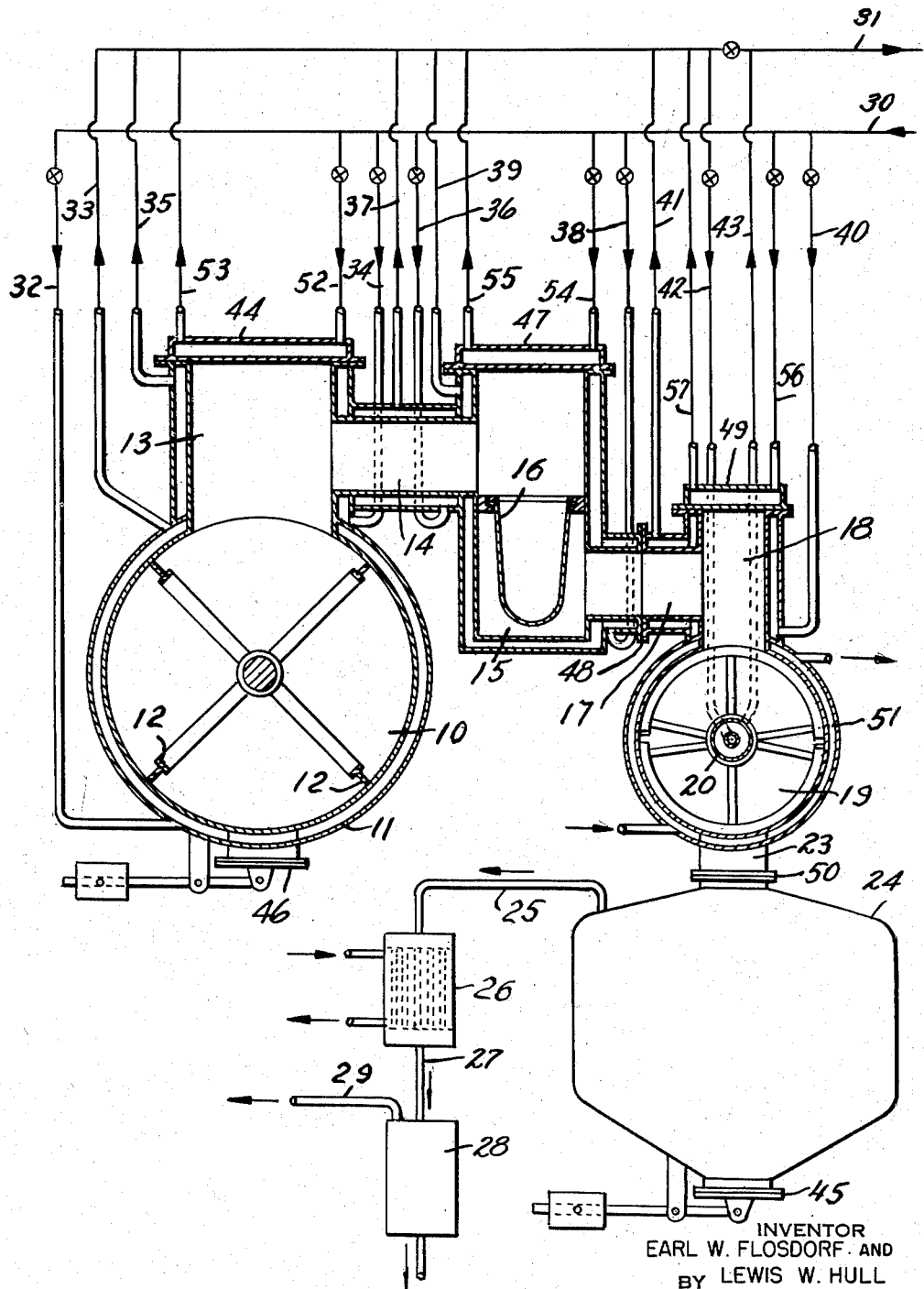

2,608,472

UNITED STATES PATENT OFFICE 2,608,472

SUBLIMATION APPARATUS

Earl W. Flosdorf, Forest Grove, and Lewis W. Hull, Huntingdon Valley, Pa., assignors to F. J. Stokes Machine Company, Philadelphia, Pa., a corporation of Pennsylvania Application January 29, 1948, Serial No. 5,078

8 Claims. (Cl. 23—264)

This invention relates to an improved process and an improved apparatus for the purification of certain chemical solids by sublimation. More particularly, it relates to purification by vacuum sublimation, with apparatus and by a process adapted to continuous or semi-continuous operation, of sublimable substances, such as salicylic acid, benzoic acid, magnesium, and lithium, which are often required in a state of high purity, but which may be contaminated with non-volatile impurities or which may be subject to decomposition under ordinary pressures.

Salicylic acid, as commonly produced, is obtained in impure form, which may contain as much as 0.5% phenol, small amounts, ranging from 0.1 to 0.2%, of inorganic sulfates and chlorides, traces of dicarboxy acids. Its color may be off white. It is a light, fluffy powder. Because the product is a therapeutic product, it is necessary that its purity be such as at least to meet the U. S. P. minimum requirements.

Previously described processes for purifying salicylic acid by vacuum sublimation have generally been batch processes of prolonged vacuum cycle and relatively low yield, or have contemplated entrainment sublimation technique, in which case the sublimed product is highly fluffy, troublesome to handle and expensive to ship. Also the incidence of sublimate contamination by carry-over of the impure material is destructive of high efficiency with U. S. P. product quality.

The present invention provides an improved process and apparatus for the purification of salicyclic acid by vacuum sublimation which operates on a short cycle yet produces high yields without the necessity of recycling. Moreover, the process and apparatus may be advantageously and conveniently adapted to continuous or semi-continuous operation without sacrificing operating efficiency or high standard of product purity. In the case of salicylic acid the breakdown of the acid to phenol and carbon dioxide through prolonged exposure to relatively high temperature is avoided. The sublimate is recovered in the form of a dense compact material which is easily handled and has desirable physical form as compared with the light fluffy crude material, or the sublimate produced by entrainment processes. Purification of the product is more than adequate to comply with the requirements for the final product, analyses showing that all phenol is removed and that no chlorides, sulfates or other inorganic contaminants remain.

In accordance with the present invention the crude salicylic acid is purified by sublimation under a vacuum which is relatively high, that is below 8 mm. of mercury absolute pressure and advantageously about 1 to 2 mm. or lower. The process is conducted in a vaporizing zone and a condensing zone. The crude material is charged to the vaporizing zone where the necessary heat to directly vaporize the material at the reduced pressure prevailing is supplied. The charge is agitated during vaporization in order to obtain improved heat transfer and to facilitate bulk loading. The vaporized material is condensed upon cooling surfaces in a separate condensing zone and the sublimate is continuously removed from the cooling surfaces by a rotating sweeper or scraper. In this way plugging, process slow-down, and cooling inefficiency are obviated and the essential flow of continuous operation is provided. Advantageously, the vapors from the vaporizing zone are passed through a filter which removes entrained material. The sublimate which is continuously swept or scraped from the condensing surfaces is collected in a separate collecting chamber adapted to receive the discharge from the condensing zone. The entire system is evacuated by any convenient vacuum-producing means such as a mechanical pump, and advantageously a by-product condenser is situated between the sublimate collector and the pump to remove moisture and the small amounts of phenol produced in the process. If a stream ejector is used for producing the vacuum, there obviously is no need for a by-product condenser.

To facilitate agitation, the vaporizing chamber and the condensing chamber are ordinarily cylindrical vacuum vessels each fitted with an internally and rotatably mounted shaft to which are affixed agitating blades or scraping arms and blades. Where continuous operation is desired, the crude material may be charged to the vaporizing cylinder by means of a vacuum-sealed conveying system or may be drawn in from a vacuum sealed hopper by the suction of the system. For the condensing cylinder a spiral bladed scraper or sweeper has advantages in continuously removing the sublimate from the cooling surfaces while conveying it to the discharge outlet through which it drops into a sublimate collecting hopper or is conveyed to a suitable collector. Similarly, the internal removing means may consist of a cooled drum operating in conjunction with a fixed knife, in which case the external jacketed chamber is maintained at a slightly higher temperature than the drum. In continuous operation, it is apparent that a plurality of collectors may be provided so that the discharge may be switched from a full to empty tank.

The temperature in the vaporizing zone may be varied substantially and in general will be related to the pressure which is maintained within the system, such that the temperature of the vaporizing zone is substantially above that corresponding to the salicylic acid vapor pressure equivalent to the pressure within the system. Inversely, the temperature of the cooling surfaces in the condensing zone is maintained below the temperature at which the vapor pressure of the sublimate is equivalent to the pressure in the system. Excellent results are obtained by heating the vaporizing cylinder with saturated steam at a pressure of the order of 50 pounds per square inch and cooling the condensing cylinder with water at about 40–50° F. although the cooling water temperatures may range considerably higher. Where the vacuum is relatively high, for example, 1 mm. or lower, lower temperatures than those corresponding to 40–50 pounds steam may be used. Excessively high temperatures should not be used in vaporization to avoid decomposition of salicylic acid to phenol and carbon dioxide which starts at about 130° C. although it is slow at this temperature. As indicated, heat is supplied to the vaporizing cylinder by means of indirect heat exchange which may be effected through the provision of heating coils, tubes or by jacketing the vaporizing chamber and auxiliary equipment with a concentric outer shell, and by circulating heat exchange media through the heating passages. The vaporizing temperature should be similarly maintained in the filter chamber and the various ducts or conduits connecting the vaporizing cylinder, filter chamber, and condensing cylinder. Heat exchange media other than steam may be used or other indirect heating means such as electrical heating utilized. With materials such as lithium and magnesium a higher temperature may be maintained by Dowtherm or direct firing. The condensing cylinder is cooled in analogous fashion by circulation of a cooling medium through or over the cooling surfaces.

The invention will be further described in connection with the appended drawing which illustrates one form of apparatus which embodies the invention and may be used with advantage for the practice of the process of the invention. In the apparatus illustrated, there is provided a vaporizing cylinder 10 equipped with a concentric outer shell 11, and a rotary shaft with affixed agitating blades 12. The vapors rise through outlet riser 13 into duct 14 and thence into filter chamber 15. As shown, the filter is of the bag type and the filter element 16 may be glass cloth. From the filter chamber, the vapors pass through duct 17 and adaptor 18 into condensing cylinder 19. Condensing cylinder 19 is equipped with a rotary, hollow-shaft agitator or sweeper 20, advantageously equipped with spiral-shaped blades. The sublimate then drops through discharge outlet pipe 23 into receiving hopper 24, which is fitted with a suitable vacuum line 25 leading to the vacuum pumps. Alternatively, the vacuum may be applied at an earlier point in the system; e. g. on the condensing chamber. By-product condensers 26 and condensate receiving pot 28 are provided by means of vacuum lines 27 and 29 between receiving hopper 24 and the pumps.

Steam is supplied to the system from steam manifold 30 through lines 32, 34, 36, 38 and 40 to the heating shells of cylinder 10, riser 13, duct 14, filter chamber 15, adaptor 18 and connecting duct 17. Steam manifold 31 provides the return system for steam lines 33, 35, 37, 39 and 41. In addition, low pressure steam may be supplied to the hollow shaft of spiral agitator 20 through a by-pass system 42, 43 off manifold 31. Agitator shaft 12 similarly may be a hollow shaft arranged for steam heating. Means for rotating shafts 12 and 20 is not shown but this may comprise any convenient driving means and the shafts may be separately geared and driven, or may be coupled and driven by the same power source. Ducts 14 and 17 are of relatively large cross section and it will be noted that flanged openings 44, 45, 46, 47, 48, 49 and 50 are provided for ease of assembly and cleaning. Obviously, flanges 44, 47, and 49 should be steam-jacketed in order to avoid premature condensation of sublimate. As shown, steam may be provided from manifold 30 to flanges 44, 47, and 49 through inlet lines 52, 54, and 56 respectively with return to manifold 31 through lines 53, 55, and 57 respectively. Vaporizing cylinder 10, riser 13, adaptor 18, ducts 14 and 17 and filter chamber 15 are jacketed for 100 pounds steam pressure, while condensing cylinder 19 is equipped with cooling jacket 51, which, however, may be used as a heating jacket in cleaning or in a preliminary drying operation. The apparatus, or at least such parts of it that may be exposed to salicylic acid in vapor or solid form at a point in the flow following the filter, is of course constructed of material suitably resistant to salicylic acid such as stainless steel.

In the operation of the apparatus illustrated, crude salicylic acid may be charged to vaporizing cylinder 10 through header 44 for batch operation, or may be drawn from an auxiliary feeding hopper (not shown) through door 46 for continuous operation. The chamber is evacuated with any suitable pump, such as a mechanical pump to a pressure below 8 mm., advantageously around 1 mm. or lower, and the material is vaporized through the heat supplied by saturated steam of 50 pounds per square inch pressure circulating in the heating jackets of the vaporizing cylinder, filter chamber and connecting ducts. The sublimate condenses on the cooled internal surfaces of condensing cylinder 19. To avoid plugging around the first cooling areas, sweeper 20 removes the sublimate as soon as it is deposited, carrying it to the bottom of the cylinder from which it is passed to the receiving hopper. The shaft of sweeper 20 is heated by steam circulation to minimize the deposition of sublimate on the shaft and blades. During the course of the operation the small amount of phenol present in the impure salicylic acid is condensed in condenser 26 and collected in receiving pot 28 in the amount of approximately one pint of phenol per ton of salicyclic acid.

The improved apparatus and process of this invention may be readily adapted to the purification of benzoic acid by vacuum sublimation. Pure benzoic acid has a melting point of 122° C., and to meet the U. S. P. specifications must be a white powder having a minimum assay of 99.5% on a dry basis and an ash content of 0.05% maximum. It must dissolve in 10% sodium carbonate solution to give a clear and colorless solution.

Benzoic acid begins to sublime at approximately 90° to 100° C., and boils at 249° C. As a preliminary step, however, it is advisable to dry the material. This can be conveniently done in batch operation by circulating warm water or low pressure steam in both the heating and cooling jackets. The moisture taken off under the conditions of moderate vacuum passes through the vacuum pumps or may be condensed in a secondary water condenser.

For the purification of benzoic acid, the equipment is advantageously constructed of aluminum. An operation conducted at a temperature of 180–190° F. with steam under pressure of 15 pounds per square inch is illustrative. The vacuum for this operation may be about 2 mm. and the water cooling temperature in the cooling circuit about 58° F. Similarly, the procedure and apparatus described may be adapted to the purification of other sublimable substances where analogous problems are presented, or to the selective sublimation of sublimable substances. For example, mixtures of substances sublimable under different conditions of temperature and pressure may be separated selectively. Conversely, the method and apparatus described may be utilized to purify relatively non-volatile substances contaminated with solid impurities, volatile under the conditions of temperature and pressure selected, by subliming the contaminants and recovering the purified material as a residue from the vaporizing chamber.

We claim:

1. Apparatus for purification by vacuum sublimation including a jacketed vaporizing cylinder, an internal scraper-type agitator rotatably mounted within the vaporizer, a jacketed condensing cylinder, an internal sweeper comprising a hollow shaft with affixed sweeping arms rotatably mounted within the condenser, a jacketed filter chamber and filtering element situated between the vaporizer and the condenser, a jacketed duct connecting said vaporizing cylinder, filter chamber and condensing cylinder, means for circulating a heating medium through the outer shell of said jacketed vaporizing cylinder, jacketed duct, and jacketed filter chamber, and through said hollow shaft, means for circulating a cooling medium through the outer shell of said jacketed condensing cylinder; means for rotating said agitator and said sweeper; a sublimate collector chamber situated to receive the discharge from said condensing cylinder; and a vacuum pump providing suction on said system.

2. Apparatus for purification by vacuum sublimation including a jacketed vaporizing cylinder, an internal scraper-type agitator rotatably mounted within the vaporizer, a jacketed condensing cylinder, an internal sweeper comprising a hollow shaft with affixed sweeping arms rotatably mounted within the condenser, a jacketed filter chamber and filtering element situated between the vaporizer and the condenser, a jacketed duct connecting said vaporizing cylinder, filter chamber and condensing cylinder, means for circulating a heating medium through the outer shell of said jacketed vaporizing cylinder, jacketed duct, and jacketed filter chamber, and through said hollow shaft, means for circulating a cooling medium through the outer shell of said jacketed condensing cylinder; means for rotating said agitator and said sweeper; a sublimate collector chamber situated to receive the discharge from said condensing cylinder; a vacuum pump providing suction on said system; and a by-product condenser intermediate said pump and said collector chamber.

3. Apparatus for purification by vacuum sublimation including a vaporizing chamber, an internal scraper-type agitator rotatably mounted within the vaporizer, a condensing chamber, an internal sweeper comprising a hollow shaft with affixed sweeping arms rotatably mounted within the condenser, a vapor-filtering element situated between the vaporizer and the condenser, means for heating said vaporizing chamber, filtering element and sweeper arms by indirect heat exchange, means for cooling said condensing chamber by indirect heat exchange, means for rotating said agitator and sweeper, a sublimate collector chamber situated to receive the discharge from said condensing chamber, and means for evacuating said system.

4. Apparatus for purification by vacuum sublimation including a vaporizing chamber, an internal agitator rotatably mounted within the vaporizer, a condensing chamber, an internal sweeper rotatably mounted within the condenser, a vapor-filtering element situated between the vaporizer and condenser, means for heating said vaporizing chamber and filtering element by indirect heat exchange, means for cooling said condensing chamber by indirect heat exchange, means for rotating said agitator and sweeper, a sublimate collector chamber situated to receive the discharge from said condensing chamber, and means for evacuating said system.

5. Apparatus for purification by vacuum sublimation including a vaporizing chamber, an internal agitator rotatably mounted within the vaporizer, a condensing chamber with connection to the vaporizer, an internal sweeper rotatably mounted within the condenser, a vapor-filtering element situated intermediate the vaporizer and condenser, means for heating said vaporizing chamber and filtering element by indirect heat exchange, means for cooling said condensing chamber by indirect heat exchange, means for rotating said agitator and sweeper, and means for evacuating said system.

6. Apparatus for purification by vacuum sublimation including a vaporizing chamber, an internal agitator rotatably mounted within the vaporizer, a condensing chamber, an internal sweeper rotatably mounted within the condenser, means for heating said vaporizing chamber by indirect heat exchange, means for cooling said condensing chamber by indirect heat exchange, means for rotating said agitator and sweeper, and vacuum-producing means for evacuating said system.

7. Apparatus for purification by vacuum sublimation including a vaporizing unit comprising a chamber and internal agitating means rotatably mounted within the vaporizer, a condensing unit comprising a condensing surface and sweeping means rotatably movable with respect to each other, means for rotating the movable elements in said vaporizing and condensing units, means for heating said vaporizing chamber by indirect heat exchange, means for cooling said condensing surface by indirect heat exchange, and vacuum-producing means for evacuating said system.

8. Apparatus for purification by vacuum sublimation including a vaporizing chamber, an internal scraper-type agitator rotatably mounted within the vaporizer, a condensing chamber, a drum rotatably mounted within the condenser, a fixed knife mounted within the condenser in bearing contact with the surface of the drum, a vapor-filtering element situated between the vaporizer and the condenser, means for heating said vaporizing chamber and filtering element by indirect heat exchange, means for cooling said condensing chamber and the surface of said drum by indirect heat exchange, means for rotating said agitator and drum, a sublimate collector chamber situated to receive the discharge from said condensing chamber, and means for evacuating said system.

EARL W. FLOSDORF.
LEWIS W. HULL.

REFERENCES CITED

The following references are of record in the file of this patent:

UNITED STATES PATENTS

| Number    | Name       | Date           |
|-----------|------------|----------------|
| 1,574,988 | Marx       | Mar. 2, 1926   |
| 1,613,632 | Wilkinson  | Jan. 11, 1927  |
| 1,662,056 | Field      | Mar. 13, 1928  |
| 1,693,243 | Loomis     | Nov. 27, 1928  |
| 1,987,282 | Compte     | Jan. 8, 1935   |
| 1,987,301 | Livingston | Jan. 8, 1935   |
| 2,067,019 | Riegler    | Jan. 5, 1937   |
| 2,358,697 | Filbert    | Sept. 19, 1944 |